United States Patent
Ibrahim et al.

(10) Patent No.: US 12,377,748 B2
(45) Date of Patent: Aug. 5, 2025

(54) SMART EV CHARGER WITH ADAPTIVE INTERFACE AND MULTI-PROTOCOL COMPATIBILITY

(71) Applicant: DCBEL INC., Montréal (CA)

(72) Inventors: Peter Ibrahim, Westmount (CA); Hani Vahedi, Brossard (CA); Jean-Hugues Deschenes, Montréal (CA); Marc-André Forget, Saint Lazare (CA)

( * ) Notice: Subject to any disclaimer, the term of this patent is extended or adjusted under 35 U.S.C. 154(b) by 587 days.

(21) Appl. No.: 17/440,227

(22) PCT Filed: Mar. 19, 2020

(86) PCT No.: PCT/CA2020/050367
§ 371 (c)(1),
(2) Date: Sep. 17, 2021

(87) PCT Pub. No.: WO2020/186357
PCT Pub. Date: Sep. 24, 2020

(65) Prior Publication Data
US 2022/0158464 A1    May 19, 2022

Related U.S. Application Data (60) Provisional application No. 62/820,474, filed on Mar. 19, 2019.

(51) Int. Cl.
*B60L 53/66* (2019.01)
*B60L 53/10* (2019.01)
(Continued)

(52) U.S. Cl.
CPC .............. *B60L 53/66* (2019.02); *B60L 53/11* (2019.02); *B60L 53/14* (2019.02); *B60L 53/16* (2019.02);
(Continued)

(58) Field of Classification Search
CPC .......... B60L 53/66; B60L 53/11; B60L 53/14; B60L 53/16; B60L 53/30; B60L 53/305;
(Continued)

(56) References Cited

U.S. PATENT DOCUMENTS

| 9,496,750 B2 | 11/2016 | Hayashigawa et al. |
| 11,949,342 B2 * | 4/2024 | Ibrahim ................ H02M 7/003 |

(Continued)

FOREIGN PATENT DOCUMENTS

| CN | 103259299 A | 8/2013 |
| CN | 103259826 A | 8/2013 |

(Continued)

OTHER PUBLICATIONS

Corresponding Indian patent application No. 202127043582 Office Action dated Jan. 25, 2023.
(Continued)

*Primary Examiner* — Richard Isla
*Assistant Examiner* — Manuel Hernandez
(74) *Attorney, Agent, or Firm* — Anglehart et al.

(57) ABSTRACT

An EV charger has an AC port, a variable voltage DC power supply connected to the AC port and comprising a controller having an input to receive charging parameters, a charge cable connector connectable to a battery, an interface connectable to the connectors and to the input of the DC power supply wherein the interface performs either translating a battery management system voltage command regarding charging parameters of the battery received via the charge cable connector into the input for the variable voltage DC power supply, or generating the input for the variable voltage DC power supply defining the charging parameters for the battery from measured information about the battery.

12 Claims, 10 Drawing Sheets

(51) Int. Cl.

| | | |
|---|---|---|
| *B60L 53/14* | (2019.01) | |
| *B60L 53/16* | (2019.01) | |
| *B60L 53/20* | (2019.01) | |
| *B60L 53/30* | (2019.01) | |
| *B60L 53/31* | (2019.01) | |
| *B60L 53/62* | (2019.01) | |
| *B60L 58/12* | (2019.01) | |
| *H02J 7/00* | (2006.01) | |
| *H02J 7/02* | (2016.01) | |
| *H02J 7/34* | (2006.01) | |
| *H04L 67/12* | (2022.01) | |
| *H04L 67/125* | (2022.01) | |
| *H04L 69/08* | (2022.01) | |
| *H02M 1/00* | (2006.01) | |
| *H02M 7/68* | (2006.01) | |

(52) U.S. Cl.
CPC ............ *B60L 53/20* (2019.02); *B60L 53/30* (2019.02); *B60L 53/305* (2019.02); *B60L 53/31* (2019.02); *B60L 53/62* (2019.02); *B60L 58/12* (2019.02); *H02J 7/00036* (2020.01); *H02J 7/0042* (2013.01); *H02J 7/02* (2013.01); *H02J 7/345* (2013.01); *H04L 67/12* (2013.01); *H04L 67/125* (2013.01); *H04L 69/08* (2013.01); *H02J 2207/20* (2020.01); *H02J 2310/48* (2020.01); *H02M 1/0009* (2021.05); *H02M 7/68* (2013.01)

(58) Field of Classification Search
CPC ...... B60L 53/31; B60L 53/62; H02J 7/00036; H02J 7/0042; H02J 7/02; H02J 7/345; H02J 2207/20; H02J 2310/48; H02M 1/0009; H02M 7/68; H04L 67/125
USPC ........................................................ 320/109
See application file for complete search history.

(56) References Cited

U.S. PATENT DOCUMENTS

| | | | |
|---|---|---|---|
| 2012/0013301 A1 | 1/2012 | Gaul et al. | |
| 2013/0020993 A1 | 1/2013 | Taddeo et al. | |
| 2013/0049677 A1* | 2/2013 | Bouman | B60L 1/02 320/106 |
| 2013/0093394 A1 | 4/2013 | Iyasu et al. | |
| 2013/0214738 A1 | 8/2013 | Chen et al. | |
| 2015/0061569 A1 | 3/2015 | Alexander et al. | |
| 2015/0224890 A1* | 8/2015 | Kim | B60L 53/62 320/109 |
| 2015/0291049 A1* | 10/2015 | DeBoer, III | B60L 53/16 320/109 |
| 2016/0126862 A1* | 5/2016 | Vahedi | H02M 7/537 363/131 |
| 2016/0176305 A1* | 6/2016 | James | H02J 3/38 307/26 |
| 2018/0091191 A1 | 3/2018 | Berger et al. | |
| 2020/0092379 A1* | 3/2020 | Leege | B60L 53/30 |
| 2021/0313886 A1* | 10/2021 | Kim | H02M 1/0095 |
| 2022/0032794 A1* | 2/2022 | Lee | H01R 33/945 |
| 2022/0149745 A1* | 5/2022 | Ibrahim | B60L 53/22 |
| 2022/0181984 A1* | 6/2022 | Vahedi | H02M 3/33584 |
| 2022/0190712 A1* | 6/2022 | Chen | H02M 1/4225 |

FOREIGN PATENT DOCUMENTS

| | | | | |
|---|---|---|---|---|
| CN | 203481899 U | 3/2014 | | |
| CN | 203722271 U | 7/2014 | | |
| CN | 104578291 A | 4/2015 | | |
| CN | 104836270 A | 8/2015 | | |
| CN | 206544472 U | 10/2017 | | |
| CN | 107785971 A | 3/2018 | | |
| CN | 207269159 U | 4/2018 | | |
| CN | 207475213 U | 6/2018 | | |
| CN | 207530553 U | 6/2018 | | |
| CN | 207670270 U | 7/2018 | | |
| CN | 108556648 A | 9/2018 | | |
| DE | 102021118020 A1 | * | 2/2022 | ............. B60L 53/16 |
| JP | H07-194118 A | 7/1995 | | |
| JP | H08-221361 A | 8/1996 | | |
| JP | 2004-104441 A | 4/2004 | | |
| JP | 2010-109970 A | 5/2010 | | |
| JP | 2011-511612 A | 4/2011 | | |
| JP | 2014-023204 A | 2/2014 | | |
| JP | 2014-124033 A | 7/2014 | | |
| JP | 2015-012621 A | 1/2015 | | |
| JP | 2017-028787 A | 2/2017 | | |
| JP | 2017-034937 A | 2/2017 | | |
| KR | 20140044018 A | 4/2014 | | |
| KR | 101437375 B1 | 11/2014 | | |
| KR | 20150107121 A | 9/2015 | | |
| KR | 20140134070 A | 10/2021 | | |
| WO | 2018/172007 A1 | 9/2018 | | |
| WO | 2018/204965 A1 | 11/2018 | | |
| WO | 2019/071359 A1 | 4/2019 | | |

OTHER PUBLICATIONS

European application No. 20774222.2 the extended European search report dated Nov. 29, 2022.
Corresponding Canadian patent application No. 3,138,373 Office Action dated Sep. 26, 2023.
Corresponding Chinese patent application No. 202080022249.6 Office Action dated Oct. 20, 2023. (Google translations provided).
International application No. PCT/CA2020/050367 International Preliminary Report on Patentability Chapter II dated Jul. 8, 2021.
International application No. PCT/CA2020/050367 International Search Report dated Jun. 22, 2020.
International application No. PCT/CA2020/050367 Search Strategy dated Jun. 22, 2020.
International application No. PCT/CA2020/050367 Written Opinion of the International Searching Authority dated Jun. 22, 2020.
Corresponding Canadian patent application No. 3,138,373 Office Action dated Jun. 28, 2024.
Corresponding Japanese patent application No. 2021-556231 Office Action dated Jan. 31, 2024 (Translation provided).
Corresponding Chinese patent application No. 202080022249.6 Office Action dated May 17, 2024. (English translations provided).
Corresponding Japanese patent application No. 2021-556231 Office Action dated Oct. 29, 2024.
Corresponding Australian patent application No. 2020242485 Office Action dated Oct. 4, 2024.
Corresponding Mexico patent application No. MX/a/2021/011283 Office Action dated Nov. 7, 2024. (Translations provided).
Corresponding Brazilian patent application No. BR 11 2021 018224 1 Office Action dated Apr. 8, 2025. (Translations provided).
Corresponding Korean patent application No. KR10-2021-7032602 Notice of Preliminary Rejection Mar. 4, 2025. (Translations provided).

* cited by examiner

SMART EV CHARGER WITH ADAPTIVE INTERFACE AND MULTI-PROTOCOL COMPATIBILITY

The present application claims priority from U.S. provisional patent application No. 62/820,474 filed on Mar. 19, 2019, incorporated herein by reference.

TECHNICAL FIELD

The subject matter of the present application generally relates to the field of power management systems and more specifically to power management systems working with power converters such as EV chargers.

BACKGROUND

This section is intended to provide a background or context to the invention that is recited in the claims. The description herein may include concepts that could be pursued but are not necessarily ones that have been previously conceived or pursued. Therefore, unless otherwise indicated herein, what is described in this section is not prior art to the description and claims in this application and is not admitted to be prior art by inclusion in this section.

As more and more people become interested in using renewable and environmentally friendly energy resources use of solar panels, electric cars become more popular. Such technologies in most cases need to be connected to and work with the power grid or the home electrical wiring. Furthermore, in regions with variable electricity tariffs for different times of the day, using an electric vehicle and/or solar energy may be more attractive for consumers if they could manage their consumption and production of energy to benefit from energy tariffs that are cheaper.

Solar panels or photovoltaic (hereinafter "PV") systems have specific advantages as an energy source causing no pollution and no emissions which, generally, generate DC power. In order to use this energy with household equipment's an inverter is normally used. Inverter is a type of electrical converter which converts the variable direct current (DC) output of a photovoltaic (PV) solar panel into a utility frequency alternating current (AC) that can be fed into a commercial electrical grid or used by a local, off-grid electrical network. There are several types of inverters used with solar panels such as stand-alone inverters, grid-tie inverters, battery backup inverters, and intelligent hybrid inverters.

Since the electricity generation from solar panels fluctuates and may not be easily synchronized with a load's electricity consumption, when there is no solar electricity production, it is necessary to store energy for later use for example in a battery or other storage system to manage energy storage and consumption with an intelligent hybrid (smart grid) inverter.

Furthermore, electric cars ("EV"s), are becoming more and more popular. The new "level 3" charging systems, such as the charger disclosed by the applicant in the international PCT patent application having serial number PCT/CA2018/051291 published on Apr. 18, 2019 as WO2019/071359, are capable of providing in addition to AC power, DC power for home charging units. It must be mentioned that despite producing DC power, PV panel outputs cannot be directly fed to an EV vehicle to charge its battery.

Because of their ability to fast charge EVs using house electrical network, they may introduce a huge load to the home electrical network and in higher number to the grid as a whole. This means that when a Level 3 charger works, introducing new load to the house wiring system may result in overloading the wiring system.

Likewise, using a number of AC units or high usage electrical appliances may introduce high load to the household's electrical budget.

Therefore, there exist a need for an energy management system which allows users to manage their energy consumption, including charging their electric vehicles, based on their priorities without overloading their home's electrical network and going over the budget define for the household.

On the other hand, despite the fact that battery of the EVs and solar panels are good sources of energy, it is currently difficult to use them to reduce the power load and/or benefit from lower possible energy tariffs.

Hence, there exists a need for a power management system capable of managing power between different loads and sources to minimize household energy expenditure and/or help the power grid as required.

SUMMARY

The present disclosure provides, inter alia, novel and innovative solutions for the above-mentioned needs in the art which will become apparent to those skilled in the art once given this disclosure.

The present disclosure provides a charger capable of adapting different communication protocols used by different EV and their battery management systems by use of an interface to translate the protocol received from the BMS before sending it to the controller unit of the charger.

The present disclosure is further advantageous as it provides the charger with the capability of delivering power to two EVs with different communication protocols at the same time using separate interfaces.

In one broad aspect, the present disclosure provides a charger comprising, an AC port, a variable voltage DC power supply connected to the AC port and comprising a controller having an input to receive charging parameters, a charge cable connector connectable to a battery; an interface connectable to the connectors and to the input of the DC power supply, wherein the interface performs one of the following two jobs. First, translating a battery management system voltage command regarding charging parameters of the battery received via the charge cable connector into the input for the variable voltage DC power supply. Second, generating the input for the variable voltage DC power supply defining the charging parameters for the battery from measured information about the battery.

In some embodiments, the interface may be replaceable to translate different types of communication protocol. These communication protocols can be any protocol available in the art such as CHAdeMO or Tesla protocol.

It will be appreciated by those skilled in the art that the interface can be designed and programed to work any other type of protocol providing flexibility to the charger and its capabilities.

In some embodiments, the charger may have two or more interfaces each working with a different communication protocol enabling the charger to charge multiple vehicles with different protocols at the same time. For example, one connector can connect to a tesla cable and charge an EV with Tesla protocol and the other one can connect to a CHAdeMO cable and charge a n EV with Tesla protocol. In one embodiment, multiple interfaces of the charger may be the same allowing the charger to charge multiple EVs.

In some embodiments, the charger may have interfaces that may be modular and chosen as a function of a battery type or a BMS protocol. This can be done by having a backplane on which the modular interfaces may be added or alternatively, may be through direct mounting onto a chassis of the charger.

In some embodiments the charger may be supplied from three-phase power mains and provide DC charging to the EVs. Alternatively, it may be supplied from single-phase AC power source.

In some embodiments, the variable voltage DC power supply has at least one conversion module. The conversion module comprises at least one high-voltage capacitor for storing power at a voltage boosted and a circuit. The circuit comprises at least one inductor connected in series with the AC port, a low-voltage capacitor, two diodes or high-voltage switches connected between a first AC input terminal and opposed ends of the high-voltage capacitor, two intermediate low-voltage switches connected between the opposed end of the high-voltage capacitor and opposed ends of the low-voltage capacitor, and two terminal low-voltage switches connected between the opposed ends of the low-voltage capacitor and a second AC terminal. A DC load can be connected to the opposed ends of the high-voltage capacitor. It further includes a controller having at least one sensor for sensing current and/or voltage in the circuit and connected to a gate input of the two intermediate low-voltage switches and the two terminal low-voltage power switches.

In one embodiment, the controller of the circuit may be operative for causing the circuit to operate in a boost mode wherein a voltage of the high-voltage capacitor is higher than a peak voltage of the AC input, and the two intermediate low-voltage power switches and the two terminal low-voltage power switches are switched with redundant switching states in response to a measurement of a voltage present at the low-voltage capacitor so as to maintain the low-voltage capacitor at a predetermined fraction of a desired voltage for the high-voltage capacitor and to thus maintain the high voltage capacitor at a desired high voltage, with the rectifier circuit supplying the DC load and absorbing power as a five-level active rectifier with low harmonics on the AC input.

In one embodiment, the variable voltage DC power supply comprises a chassis housing a plurality of conversion modules sockets each of the modules comprising the circuit, the modules working in parallel to provide DC power.

In one embodiment, the circuit may be a bidirectional rectifier/inverter circuit comprising an inductor connected in series with an AC port, a low-voltage capacitor, two high-voltage power switches connected between a first AC terminal and opposed ends of the high-voltage capacitor, two intermediate low-voltage power switches connected between the opposed end of the high-voltage capacitor and opposed ends of the low-voltage capacitor, and two terminal low-voltage power switches connected between the opposed ends of the low-voltage capacitor and a second AC terminal, wherein a DC port can be connected to the opposed ends of the high-voltage capacitor; the controller is a first controller for a rectifier mode having at least one sensor for sensing current and/or voltage in the bidirectional rectifier/inverter and connected to a gate input of the two high-voltage power switches, the two intermediate low-voltage power switches and the two terminal low-voltage power switches for causing the rectifier circuit to operate in a boost mode wherein a voltage of the high-voltage capacitor is higher than a peak voltage of the AC input, and the two high-voltage power switches are controlled to switch on and off at a frequency of the AC input, and the two intermediate low-voltage power switches and the two terminal low-voltage power switches are switched with redundant switching states in response to a measurement of a voltage present at the low-voltage capacitor so as to maintain the low-voltage capacitor at a predetermined fraction of a desired voltage for the high-voltage capacitor and to thus maintain the high voltage capacitor at a desired high voltage, with the rectifier circuit supplying the DC load and absorbing power as a five-level active rectifier with low harmonics on the AC input; and the power converter further comprises a second controller for an inverter mode connected to the two high-voltage power switches, the two intermediate low-voltage power switches and the two terminal low-voltage power switches and configured to generate and apply to the two high-voltage power switches, the two intermediate low-voltage power switches and the two terminal low-voltage power switches signal waveforms comprising a first control signal for causing the low-voltage capacitor to be series connected with the DC port and the AC port and charged to a predetermined value proportional to a Voltage of the DC port, and a second control signal for causing the low-voltage capacitor to be disconnected from the DC port and series connected with the AC port, thereby causing the low-voltage capacitor to be discharged.

In one broad aspect, the present disclosure provides a method for using a converter having a first communication protocol with an electric vehicle (EV). The method comprises receiving an EV communication from the EV in a second communication protocol at a connector interface of the converter; converting the EV communication from the second communication protocol to the first communication protocol; and controlling the converter to respond to the converted EV communication accordingly.

In some examples of the methods, the converting the communication from the second communication protocol to the first communication protocol may include determining if the second communication protocol is in compliance with the first communication protocol of the converter. If the second communication protocol is in compliance with the first communication protocol of the converter, relaying the EV communication without conversion. If the second communication protocol is not in compliance with the first communication protocol of the converter, converting the EV communication from the second communication protocol to the first communication protocol.

In some examples of the method, the converting the EV communication from the second communication protocol to the first communication protocol may be conducted at the connector interface of the converter.

In some examples of the method, the converting the EV communication from the second communication protocol to the first communication protocol is conducted at the controller of the converter.

In some other examples, the method may also include sending a converter communication in the first communication protocol; converting the converter communication from the first communication protocol to the second communication protocol; and sending the converter communication to the EV. In one example, the converting the communication from the first communication protocol to the second communication protocol may include determining if the first communication protocol is in compliance with the second communication protocol of the EV. If the first communication protocol is in compliance with the second communication protocol, relaying the converter communication without conversion, if the first communication protocol is not in compliance with the second communication protocol, converting the converter communication from the first communication protocol to the second communication protocol.

In some other examples, the converting the converter communication from the first communication protocol to the second communication protocol may be conducted at the connector interface of the converter.

In one example, the converting the converter communication from the first communication protocol to the second communication protocol may be conducted at the controller of the converter.

BRIEF DESCRIPTION OF THE DRAWINGS

The present examples will be better understood with reference to the appended illustrations which are as follows.

DESCRIPTION

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Moreover, the described features, structures, or characteristics of the invention may be combined in any suitable manner in one or more embodiments. It will be apparent to those skilled in the art that various modifications and variations can be made to the present invention without departing from the scope of the invention. Thus, it is intended that the present invention cover the modifications and variations of this invention provided they come within the scope of the appended claims and their equivalents. Reference will now be made in detail to the preferred embodiments of the invention.

In one broad aspect, the present disclosure provides a charger comprising, an AC port, a variable voltage DC power supply connected to the AC port and comprising a controller having an input to receive charging parameters, a charge cable connector connectable to a battery; an interface connectable to the connectors and to the input of the DC power supply, wherein the interface performs one of the following two jobs. First, translating a battery management system voltage command regarding charging parameters of the battery received via the charge cable connector into the input for the variable voltage DC power supply. Second, generating the input for the variable voltage DC power supply defining the charging parameters for the battery from measured information about the battery.

Figure 1A:
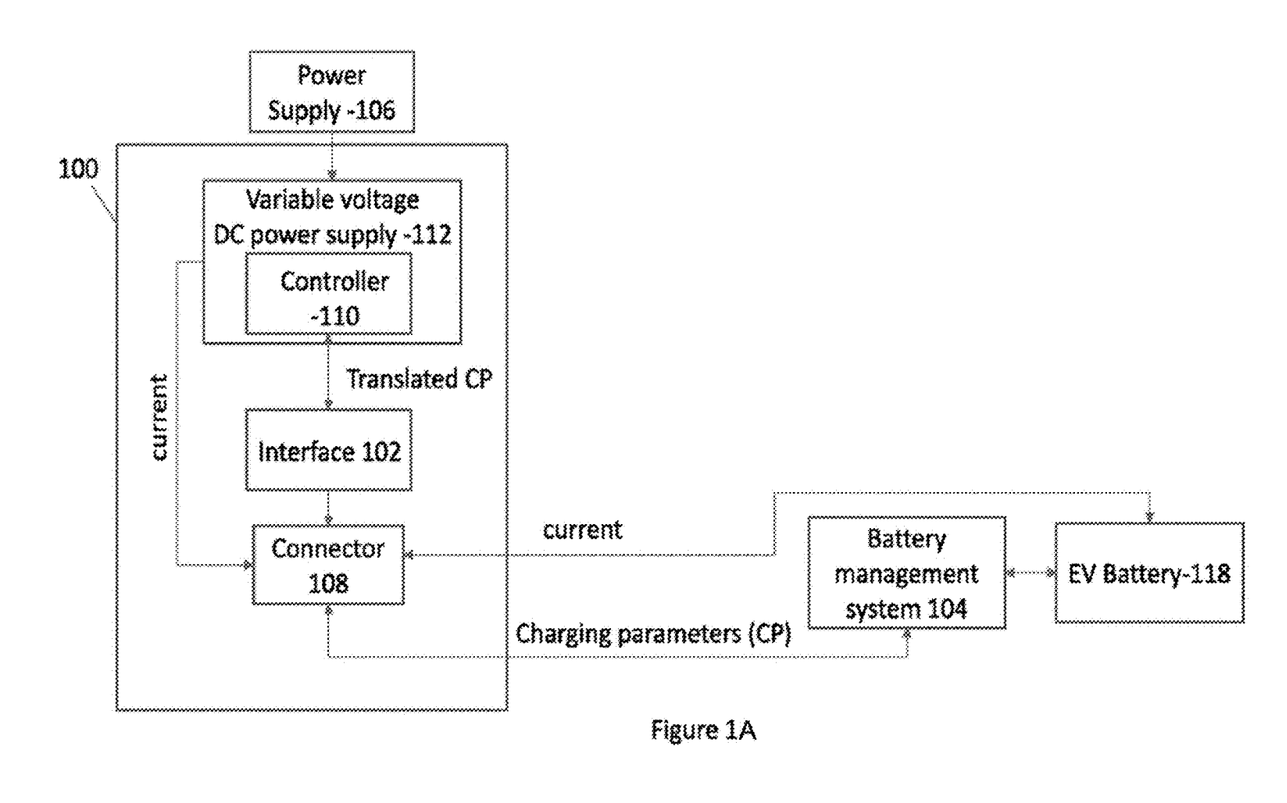
FIG. 1A illustrates a schematic illustration of an electric vehicle charging system having an interface capable of communicating with a battery management system in accordance with an embodiment of the present invention.

As illustrated in FIG. 1A, the present disclosure provides a charger 100 capable of adapting different communication protocols used by different EVs and their battery management systems by use of an interface 102 to translate the protocol received from the BMS 104 before sending it to the controller unit of the charger.

Figure 4:
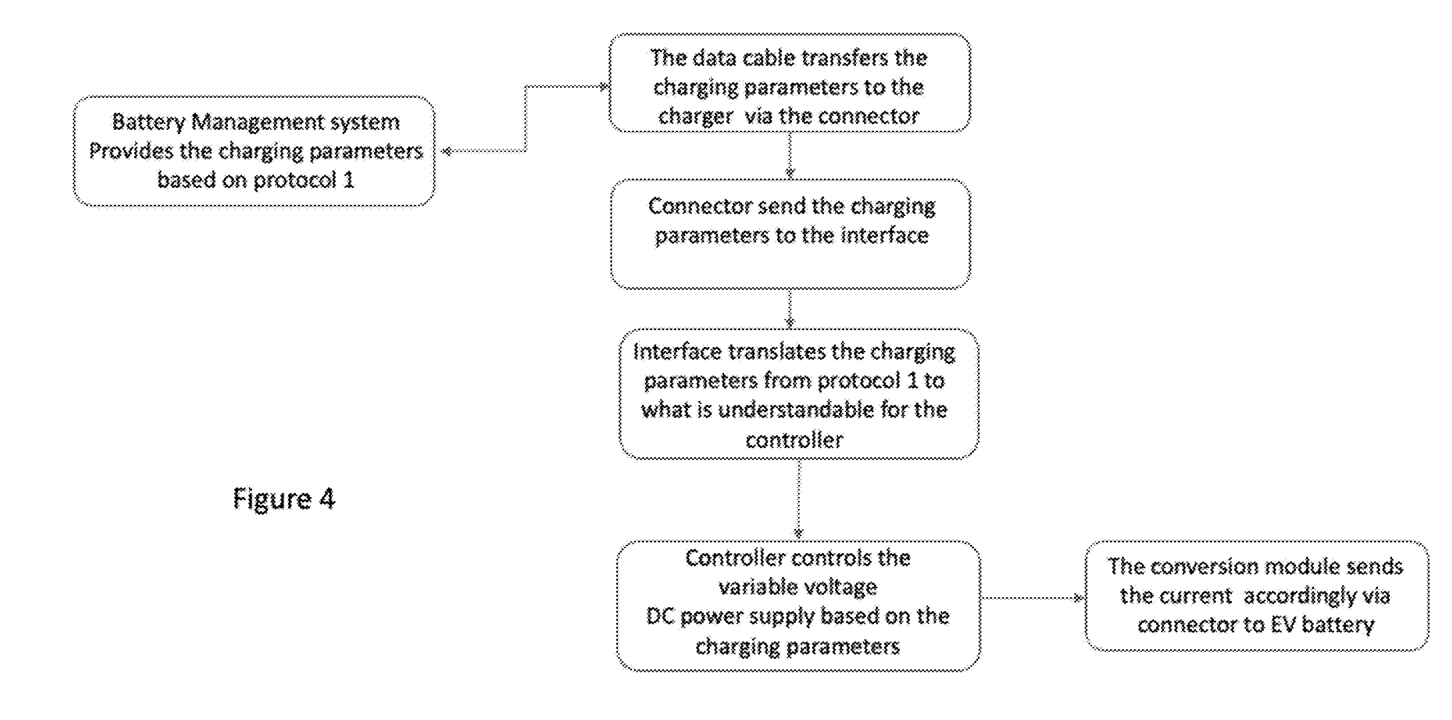
FIG. 4 is a flowchart of the steps the system shown in FIG. 3 takes to deliver the current.

FIG. 4 shows the flowchart of the charger illustrated in FIG. 1. The battery management system (BMS) 104 communicates with the interface 102 via the connector 108. The connector 108 connects to a charging cable which has charging cables carrying the current and a data cable carrying, among other information, charging parameters (CP). The connector 108 transfers the data received in the BMS communication protocol to the interface 102. The interface translates the charging parameters and send them to controller 110 which controls the variable voltage DC power supply 112. The DC power supply converts the power received from the power supply 106 accordingly and sends it to the connector 108 from which it will be sent to the EV battery 118 directly.

Figure 2:
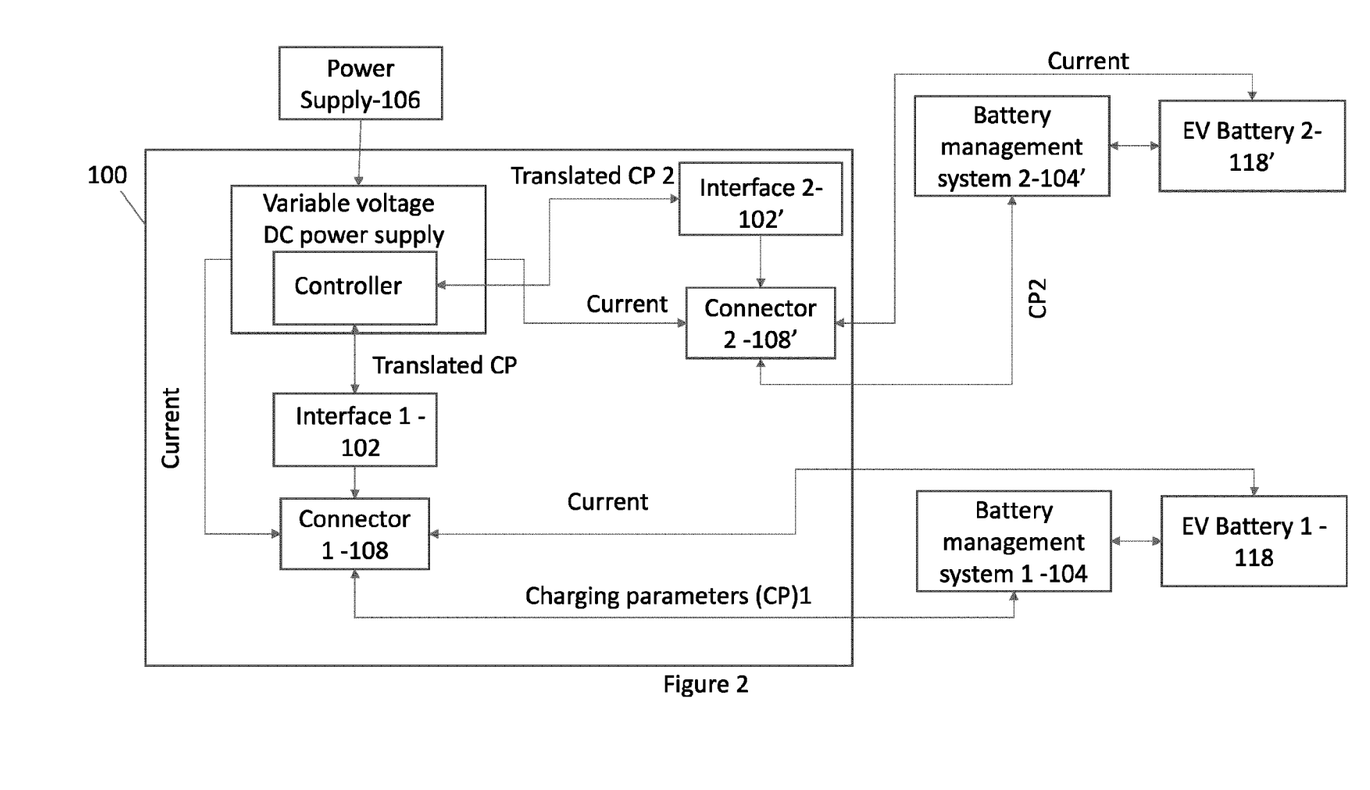
FIG. 2 illustrates a schematic illustration of an electric vehicle charging system having two different interfaces capable of communicating with two battery management systems in accordance with an embodiment of the present invention.

The present disclosure is further advantageous as it can provide the charger 100 with the capability of delivering power to two EVs with different communication protocols at the same time using separate interfaces. FIG. 2 is schematic demonstration of such embodiment. Here, the charger has two interfaces 102 and 102' communication with BMSs 104 and 104' independently enabling charging of two cars that may have same or different communication protocols at the same time.

Figure 3:
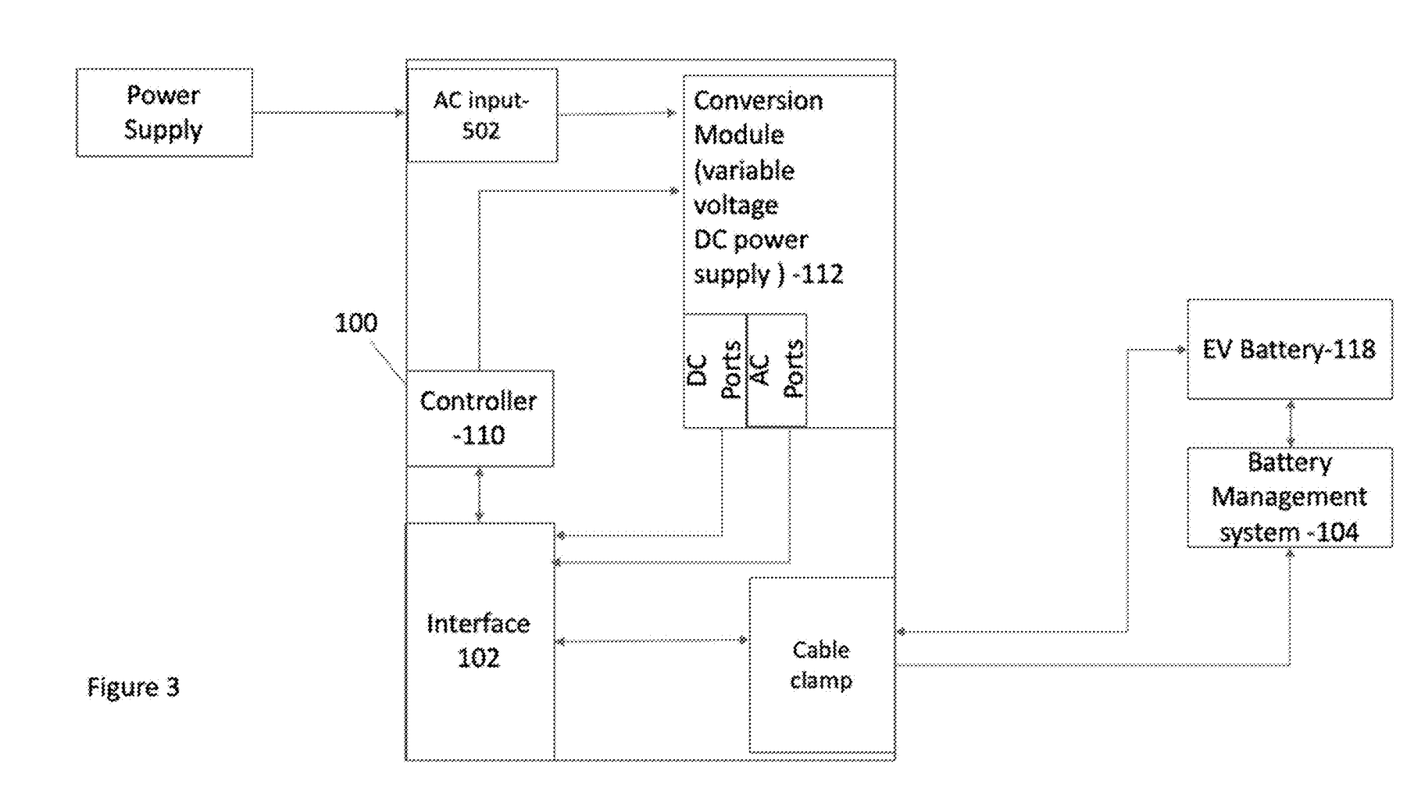
FIG. 3 shows a block diagram of the system in accordance with one embodiment of the present disclosure wherein an interface translates the communications between the battery management system (BMS) enabling the charger to communicate with the BMS.

FIG. 3 shows a block diagram of the charger 100 only with one interface 102 receiving current from the power supply 106 via AC port 502.

Figure 5:
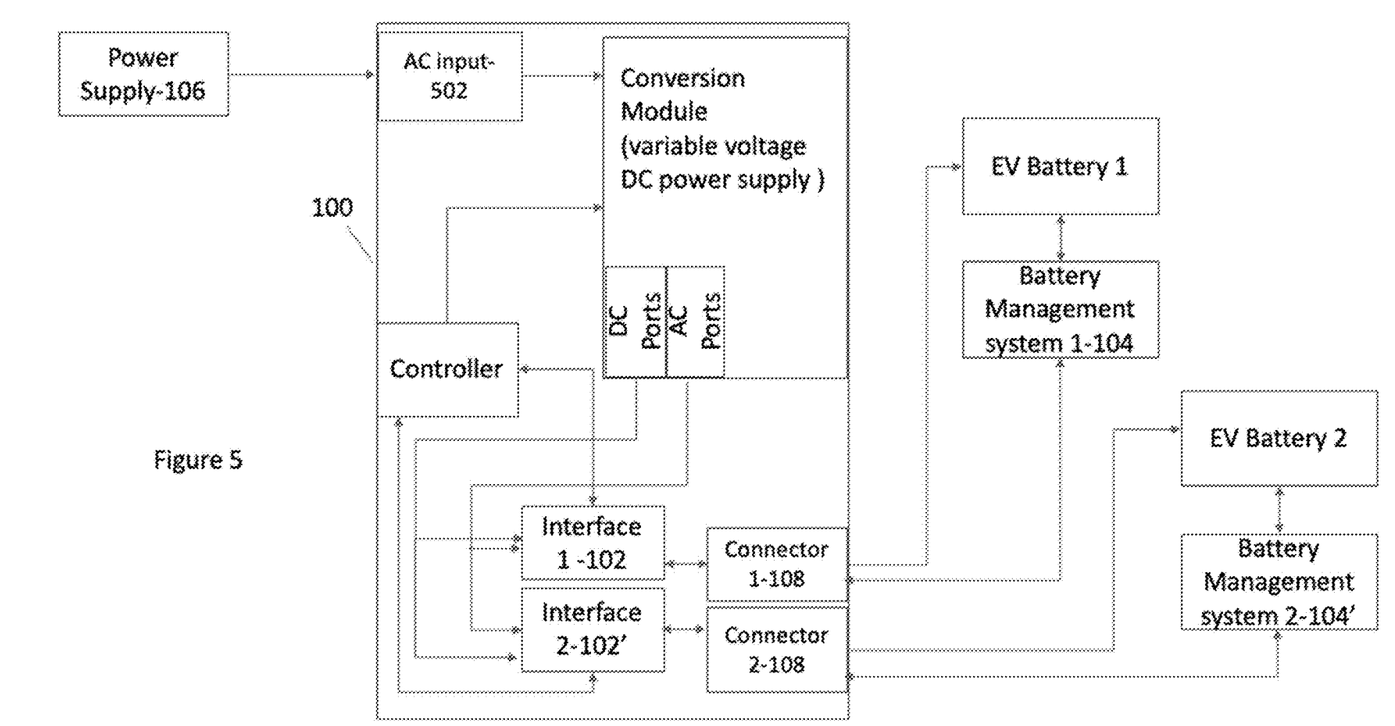
FIG. 5 illustrates a block diagram of the system in accordance with one embodiment of the present disclosure wherein the charger has two interfaces capable of translating two different communication protocols received from two different BMSs.

Likewise, FIG. 5 shows a block diagram of an embodiment of the charger disclosed herein having two connectors 108 and 108' and two interfaces 102 and 102' providing independent charging to the EV batteries 1 and 2.

In some embodiments, the interface may be replaceable to translate different types of communication protocol. These communication protocols can be any protocol available in the art such as CHAdeMO, Combined Charging System (CCS) or Tesla protocol.

It will be appreciated by those skilled in the art that the interface can be designed and programed to work any other type of protocol providing flexibility to the charger and its capabilities.

In some embodiments, the charger may have two or more interface 102 each working with a different communication protocol enabling the charger to charge multiple vehicles with different protocols at the same time. For example, one connector can connect to a Tesla cable and charge an EV with Tesla protocol and the other one can connect to a CHAdeMO cable and charge a n EV with Tesla protocol. In one embodiment, multiple interfaces of the charger may be the same allowing the charger to charge multiple EVs.

Figure 6:
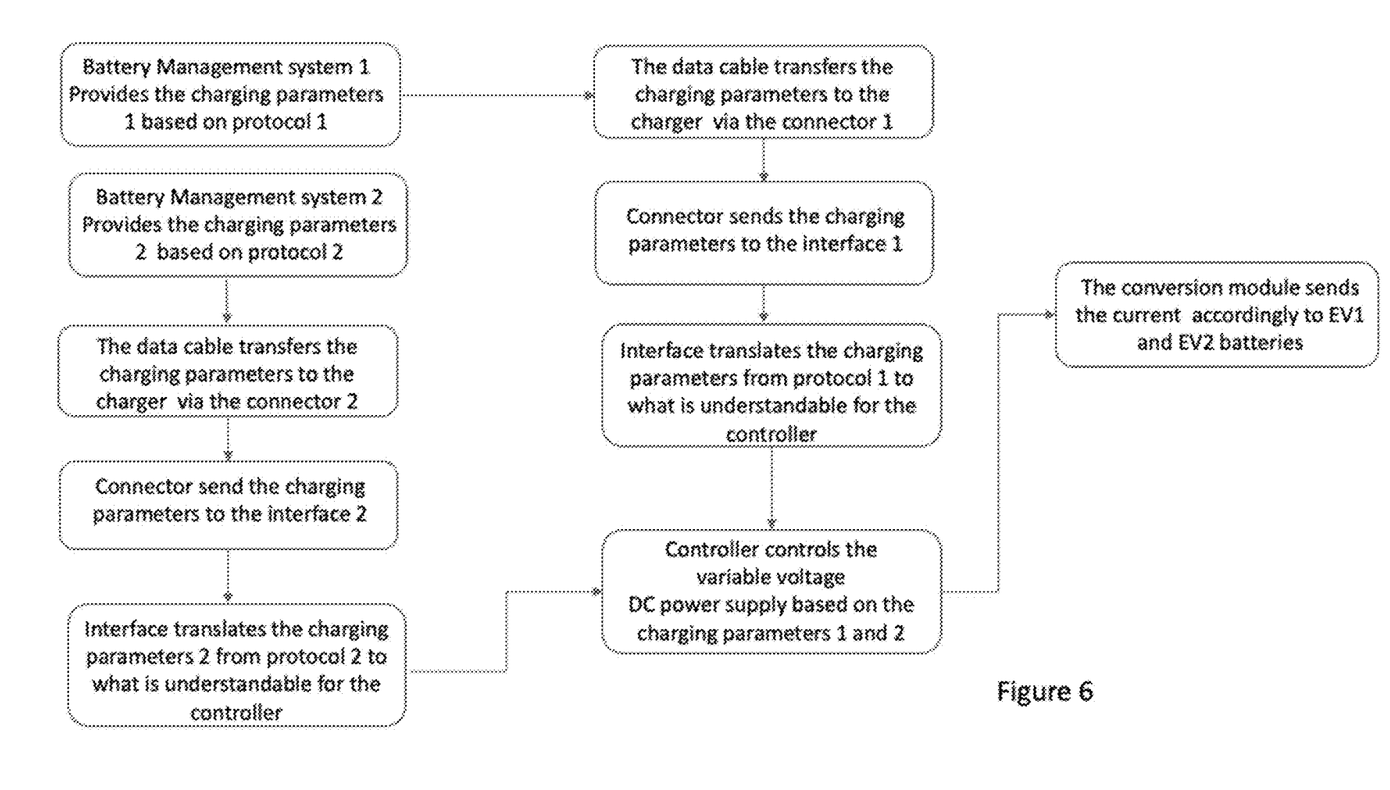
FIG. 6 is a flowchart of the steps the system shown in FIG. 5 takes to deliver the current.

FIG. 6 shows the flowchart of the charger 100 in an embodiment having two interfaces and charging two vehicles independently from their protocols.

In some embodiments, the charger may have interfaces that may be modular and chosen as a function of a battery type or a BMS protocol. This can be done by having a backplane on which the modular interfaces may be added or alternatively, may be through direct mounting onto a chassis of the charger.

Figure 7:
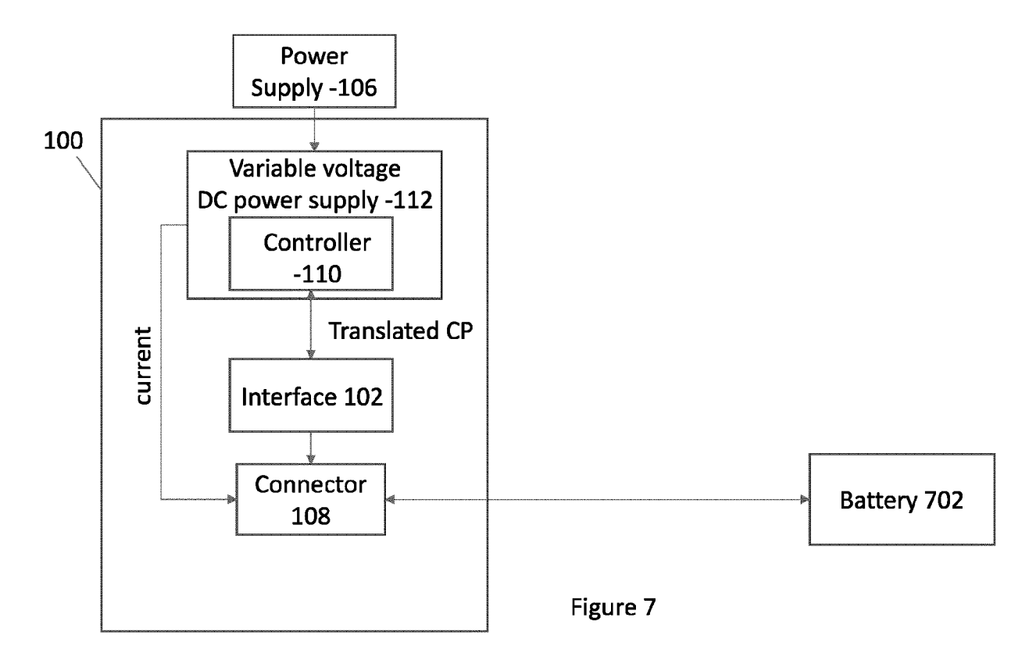
FIG. 7 illustrates a block diagram of the system in accordance with one embodiment of the present disclosure wherein an determines the charging parameters of a battery.

FIG. 7 shows the charger 100 with only one interface charging a battery 702. In this scenario the interface 102 can determine the charging parameters required for the battery 702 based on different information, it may receive. The information required for the interface 102 may be received through a user interface defining the type of the battery and the desired charging voltage speed, etc.

Alternatively, the interface 102 may receive information such as temperature, voltage, current via measurement tools, or sensor and calculate the charging parameters accordingly. As is known in the art, battery temperature can be used to regulate charging rates.

In one other embodiment, the battery may have an electronic circuit containing the charging parameters or other information regarding the battery enabling the interface to determine the charging parameters or translate them.

Figure 8:
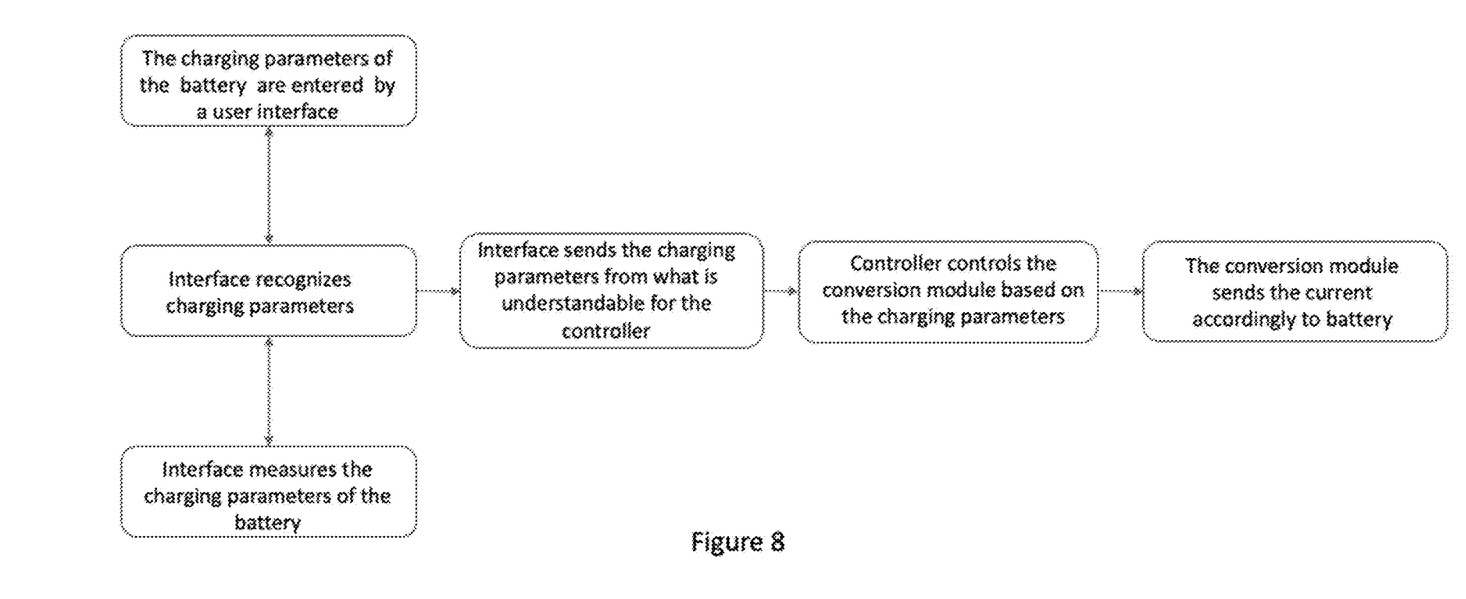
FIG. 8 is a flowchart of the steps the system shown in FIG. 7 takes to deliver the current.

FIG. 8 illustrates the flowchart used by the charger when the interface 102 is used to charge the battery 702.

Figure 9:
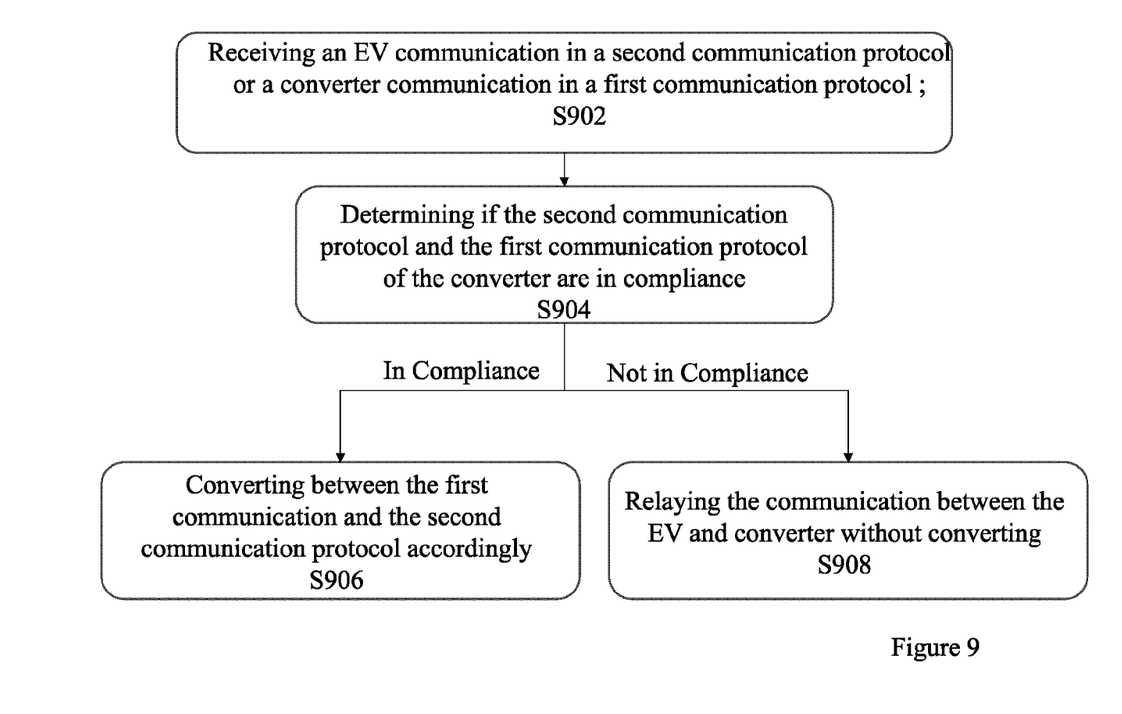
FIG. 9 is a flowchart of the method disclosed herein in accordance to one embodiment of the present disclosure.

Referring to FIG. 9 now, an example of the method used for communication between the converter having a first communication protocol and an EV having a second communication protocol has been illustrated. Box S902 shows receiving the communication at the interface 102. In some examples, this may happen in both ways meaning that the converter and the EV may communicate with each other through the interface 102. The communication then gets converted to the other communication protocol as in Box 906 and will be relayed.

In some examples, the interface 102 may determine if the communication protocol is in compliance, as in Box S904. This would help unnecessary conversion of the communication from one communication protocol to another. In this example, the communication only goes through conversion if it's not in compliance with the other communication protocol and otherwise, as in Box S908, will be only relayed.

In some other examples, the interface is predefined for communication between two specific communication protocols and is installed with the connector 108 while in some embodiments the interface may be a general interface capable of receiving different protocols.

It will be appreciated by those skilled in the art that despite the illustration in different Figures as a separate element, it could be an integrated part of the controller of converter.

In some embodiments the converter may be supplied from three-phase power mains and provide DC charging to the EVs. Alternatively, it may be supplied from single-phase AC power source with a suitable rectifier circuit.

Figure 1B:
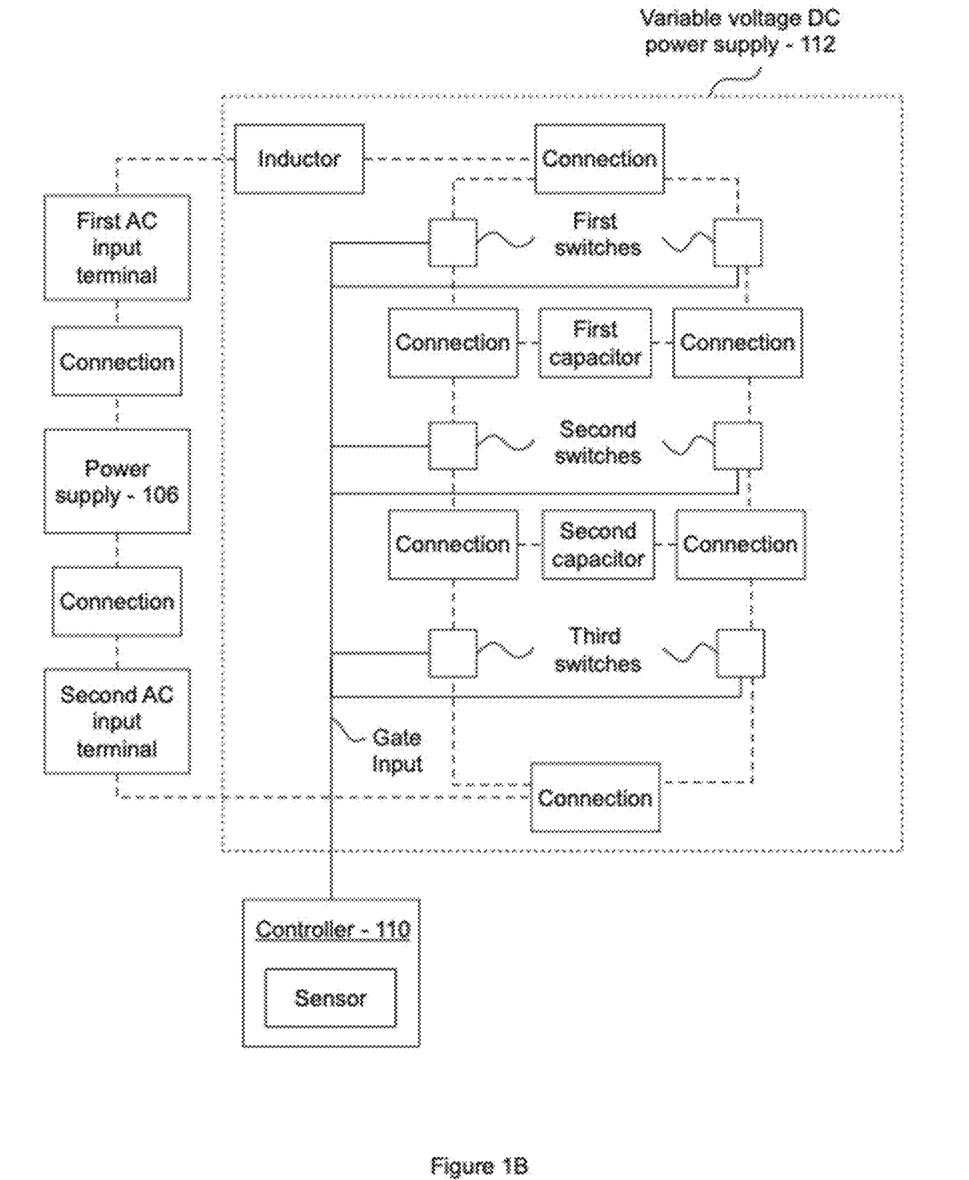
FIG. 1B schematically illustrates the variable DC voltage supply shown in FIG. 1A.

Referring to FIG. 1B now, in some embodiments, the variable voltage DC power supply 112 has at least one conversion module. The conversion module can be a switched power conversion module that pulls power from AC mains, for example, split-phase 240V AC, while respect close to unity power factor.

The conversion module may comprise at least one high-voltage capacitor for storing power at a voltage and a circuit. The circuit may comprise at least one inductor connected in series with the AC port, a second (low-voltage) capacitor, two diodes or high-voltage switches (see FIG. 1B) connected between a first AC input terminal and opposed ends of the first (high-voltage) capacitor, two intermediate low-voltage switches connected between the opposed end of the high-voltage capacitor and opposed ends of the low-voltage capacitor, and two terminal low-voltage switches connected between the opposed ends of the low-voltage capacitor and a second AC terminal. A DC load can be connected to the opposed ends of the high-voltage capacitor. It further includes a controller having at least one sensor for sensing current and/or voltage in the circuit and connected to a gate input of the two intermediate low-voltage switches and the two terminal low-voltage power switches.

In one embodiment, the controller of the circuit may be operative for causing the circuit to operate in a boost mode wherein a voltage of the high-voltage capacitor is higher than a peak voltage of the AC input, and the two intermediate low-voltage power switches and the two terminal low-voltage power switches are switched with redundant switching states in response to a measurement of a voltage present at the low-voltage capacitor so as to maintain the low-voltage capacitor at a predetermined fraction of a desired voltage for the high-voltage capacitor and to thus maintain the high voltage capacitor at a desired high voltage, with the rectifier circuit supplying the DC load and absorbing power as a five-level active rectifier with low harmonics on the AC input.

In one embodiment, the variable voltage DC power supply comprises a chassis housing a plurality of conversion modules sockets each of the modules comprising the circuit, the modules working in parallel to provide DC power.

In one embodiment, the circuit may be a bidirectional rectifier/inverter circuit comprising an inductor connected in series with an AC port, a low-voltage capacitor, two high-voltage power switches connected between a first AC terminal and opposed ends of the high-voltage capacitor, two intermediate low-voltage power switches connected between the opposed end of the high-voltage capacitor and opposed ends of the low-voltage capacitor, and two terminal low-voltage power switches connected between the opposed ends of the low-voltage capacitor and a second AC terminal, wherein a DC port can be connected to the opposed ends of the high-voltage capacitor; the controller is a first controller for a rectifier mode having at least one sensor for sensing current and/or voltage in the bidirectional rectifier/inverter and connected to a gate input of the two high-voltage power switches, the two intermediate low-voltage power switches and the two terminal low-voltage power switches for causing the rectifier circuit to operate in a boost mode wherein a voltage of the high-voltage capacitor is higher than a peak voltage of the AC input, and the two high-voltage power switches are controlled to switch on and off at a frequency of the AC input, and the two intermediate low-voltage power switches and the two terminal low-voltage power switches are switched with redundant switching states in response to a measurement of a voltage present at the low voltage capacitor so as to maintain the low voltage capacitor at a predetermined fraction of a desired voltage for the high-voltage capacitor and to thus maintain the high voltage capacitor at a desired high voltage, with the rectifier circuit supplying the DC load and absorbing power as a five-level active rectifier with low harmonics on the AC input; and the power converter further comprises a second controller for an inverter mode connected to the two high-voltage power switches, the two intermediate low-voltage power switches and the two terminal low-voltage power switches and configured to generate and apply to the two high-voltage power switches, the two intermediate low-voltage power switches and the two terminal low-voltage power switches signal waveforms comprising a first control signal for causing the low-voltage capacitor to be series connected with the DC port and the AC port and charged to a predetermined value proportional to a Voltage of the DC port, and a second control signal for causing the low-voltage capacitor to be disconnected from the DC port and series connected with the AC port, thereby causing the low-voltage capacitor to be discharged.

What is claimed is:

1. A charger comprising:
an AC port;
a variable voltage bidirectional power supply connected to said AC port and comprising a controller having an input to receive charging parameters of a battery, wherein said variable voltage bidirectional power supply comprises at least one multi-level bidirectional power conversion module, wherein said at least one multi-level bidirectional power conversion module comprises:
at least one first capacitor for storing power at a first voltage;
a circuit comprising:
  at least one inductor connected in series with said AC port;
  a second capacitor for storing power at a second voltage, said second voltage is lower than said first voltage;
  two first power switches connected between said first AC input terminal and said opposed ends of said at least one first capacitor;
  two second power switches connected between said opposed ends of said at least one first capacitor and opposed ends of said second capacitor;
  two third power switches connected between said opposed ends of said second capacitor and a second AC input terminal;
  wherein a DC load is connected to said opposed ends of said at least one first capacitor; and
said controller having at least one sensor for sensing current and/or voltage in said circuit and connected to a gate input of said two first power switches, two second power switches and said two third power switches;
a charge cable connector for receiving a charging cable and connecting said charger to said battery; and
a replaceable interface connected to said charge cable connector, wherein said interface communicates with said battery through said charging cable and is connected to said input of said controller of said variable voltage bidirectional power supply, wherein said replaceable interface is configured to perform one of:
translating a battery management system (BMS) voltage command regarding charging parameters of said battery received via said charge cable connector into said input of said controller of said variable voltage bidirectional power supply; and
generating said input for said variable voltage bidirectional power supply defining said charging parameters for said battery from measured information about said battery.

2. The charger as defined in claim 1, wherein said controller is operative for causing said circuit to operate in a boost mode wherein a voltage of said at least one first capacitor is higher than a peak voltage of said AC input terminal, and said two second power switches and said two third power switches are switched with redundant switching states in response to a measurement of said second voltage present at said second capacitor so as to maintain said second capacitor at a predetermined fraction of a desired voltage for said at least one first capacitor and to thus maintain said at least one first capacitor at a desired first voltage, with said circuit supplying said DC load and absorbing power as a five-level active converter.

3. The charger as defined in claim 1, wherein said variable voltage bidirectional power supply comprises a chassis housing and a plurality of conversion module sockets associated with a plurality of multi-level bidirectional power conversion modules, wherein each of said plurality of multi-level bidirectional power conversion modules comprising said circuit, said plurality of multi-level bidirectional power conversion modules working in parallel to provide DC power to said DC load.

4. The charger as defined in claim 1 wherein:
said circuit is a bidirectional rectifier/inverter circuit comprising the inductor connected in series with the AC port, the second capacitor, said two first power switches connected between said first AC input terminal and opposed ends of said at least one first capacitor, said two second power switches connected between said opposed ends of said at least one first capacitor and said opposed ends of said second capacitor, and said two third power switches connected between said opposed ends of said second capacitor and said second AC input terminal, wherein a DC port can be connected to said opposed ends of said first capacitor;
said controller is a first controller for a rectifier mode having said at least one sensor for sensing current and/or voltage in said bidirectional rectifier/inverter and connected to said gate input of said two first power switches, said two second power switches and said two third power switches for causing said rectifier circuit to operate in a boost mode wherein said voltage of said at least one first capacitor is higher than said peak voltage of said first AC input terminal, and said two first power switches are controlled to switch on and off at a frequency of said first AC input terminal, and said two second power switches and said two terminal power switches are switched with redundant switching states in response to said measurement of a voltage present at said second capacitor so as to maintain said second capacitor at said predetermined fraction of a desired voltage for said at least one first capacitor and to thus maintain said at least one first capacitor at said desired first voltage, with said rectifier circuit supplying said DC load and absorbing power as said five-level active rectifier; and
said circuit further comprises a second controller for an inverter mode connected to said two first power switches, said two second power switches and said two third power switches and configured to generate and apply to said two first power switches, said two second power switches and said two third power switches signal waveforms comprising a first control signal for causing said second capacitor to be series connected with said DC port and said AC port and charged to a predetermined value proportional to said voltage of said DC port, and a second control signal for causing said second capacitor to be disconnected from the DC port and series connected with the AC port, thereby causing the second capacitor to be discharged.

5. A charger comprising:
an AC port;
a variable voltage bidirectional power supply connected to said AC port and comprising a controller having an input to receive charging parameters of a first battery and a second battery, wherein said variable voltage bidirectional power supply comprises at least one multi-level bidirectional power conversion module, wherein said at least one multi-level bidirectional power conversion module comprises:
   at least one first capacitor for storing power at a first voltage;
   a circuit comprising:
      at least one inductor connected in series with said AC port;
      a second capacitor for storing power at a second voltage, said second voltage is lower than said first voltage;
      two first power switches connected between said first AC input terminal and said opposed ends of said at least one first capacitor;
      two second power switches connected between said opposed ends of said at least one first capacitor and opposed ends of said second capacitor;
      two third power switches connected between said opposed ends of said second capacitor and a second AC input terminal;
      wherein a DC load is connected to said opposed ends of said at least one first capacitor; and
   said controller having at least one sensor for sensing current and/or voltage in said circuit and connected to a gate input of said two first power switches, two second power switches and said two third power switches;
a first charge cable connector for receiving a first charging cable and connecting said charger to said first battery;
a second charge cable connector for receiving a first second charging cable and connecting said charger to said second battery;
a first replaceable interface connected to said first charge cable connector, wherein said first replaceable interface communicates with said first battery through said first charging cable and is connected to said input of said controller of said variable voltage bidirectional power supply;
a second replaceable interface connected to said second charge cable connector, wherein said second replaceable interface communicates with said second battery through said second charging cable and is connected to said input of said controller of said variable voltage bidirectional power supply;
wherein said first replaceable interface and said second replaceable interface are configured to perform one of:
   translating a first battery management system (BMS) voltage command regarding said charging parameters of said first battery received via said first charge cable connector and a second BMS voltage command regarding said charging parameters of said second battery received via said second charge cable connector into said input of said controller of said variable voltage bidirectional power supply; and
   generating said input for said variable voltage bidirectional power supply defining said charging parameters for said first battery from measured information about said first battery and for said second battery from measured information about said second battery,
wherein said first replaceable interface is translating a first communication protocol, and said second replaceable interface is translating a second communication protocol, and
wherein said first replaceable interface and said second replaceable interface are modular and chosen as a function of a battery type or a protocol of a BMS.

6. A charger comprising:
an AC port;
a variable voltage DC power supply connected to said AC port and comprising a controller having an input to receive charging parameters of a first battery and a second battery, wherein said variable voltage DC power supply comprises at least one multi-level bidirectional power conversion module, wherein said at least one multi-level bidirectional power conversion module comprises:
   at least one first capacitor for storing power at a first voltage;
   a circuit comprising:
      at least one inductor connected in series with said AC port;
      a second capacitor for storing power at a second voltage, said second voltage is lower than said first voltage;
      two first power switches connected between said first AC input terminal and said opposed ends of said at least one first capacitor;
      two second power switches connected between said opposed ends of said at least one first capacitor and opposed ends of said second capacitor;
      two third power switches connected between said opposed ends of said second capacitor and a second AC input terminal;
      wherein a DC load is connected to said opposed ends of said at least one first capacitor; and
   said controller having at least one sensor for sensing current and/or voltage in said circuit and connected to a gate input of said two first power switches, two second power switches and said two third power switches;
a first charge cable connector for receiving a first charging cable and connecting said charger to said first battery;
a second charge cable connector for receiving a second charging cable and connecting said charger to said second battery;
a first replaceable interface connected to said first charge cable connector, wherein said first replaceable interface communicates with said first battery through said first charging cable and is connected to said input of said controller of said DC power supply;
a second replaceable interface connected to said second charge cable connector, wherein said second replaceable interface communicated with said second battery through said second charging cable and is connected to said input of said controller of said DC power supply;
wherein said first replaceable interface and said second replaceable interface are configured to perform one of:
   translating a first battery management system (BMS) voltage command regarding said charging parameters of said first battery received via said first charge cable connector and a second BMS voltage command regarding said charging parameters of said second battery received via said second charge cable connector into said input of said controller of said variable voltage DC power supply; and generating said input for said variable voltage DC power supply defining said charging parameters for said first battery from measured information about said first battery and for said second battery from measured information about said second battery, wherein said first replaceable interface is translating a first communication protocol, and said second replaceable interface is translating a second communication protocol, and wherein said first replaceable interface and said second replaceable interface are modular and chosen as a function of a battery type or a protocol of a BMS.

7. The charger as defined in claim 6 wherein said first replaceable interface communicates with said BMS of said first battery to perform said translating said first BMS voltage command regarding said charging parameters of said first battery received via said first charge cable connector into said input of said controller for said variable voltage DC power supply, and wherein said second replaceable interface communicates with said BMS of said second battery to perform said translating said second BMS voltage command regarding said charging parameters of said second battery received via said second charge cable connector into said input of said controller for said variable voltage DC power supply.

8. The charger as defined in claim 6 wherein said first and said second communication protocols are same protocols.

9. The charger as defined in claim 6 wherein said first and said second communication protocols are different.

10. The charger as defined in claim 6 wherein said charger further comprises a chassis and wherein said first replaceable interface and said second replaceable interface are mounted onto said chassis.

11. The charger as defined in claim 6 wherein said variable voltage DC power is supplied from three-phase power mains.

12. The charger as defined in claim 6 wherein said variable voltage DC power is supplied from single-phase AC power source.

* * * * *